Oct. 28, 1969          H. W. MOLZAHN          3,474,602
HARVESTER PLATFORM WITH CROP STRIPPER AND GUIDING MEANS
Filed Oct. 23, 1967                    2 Sheets-Sheet 1
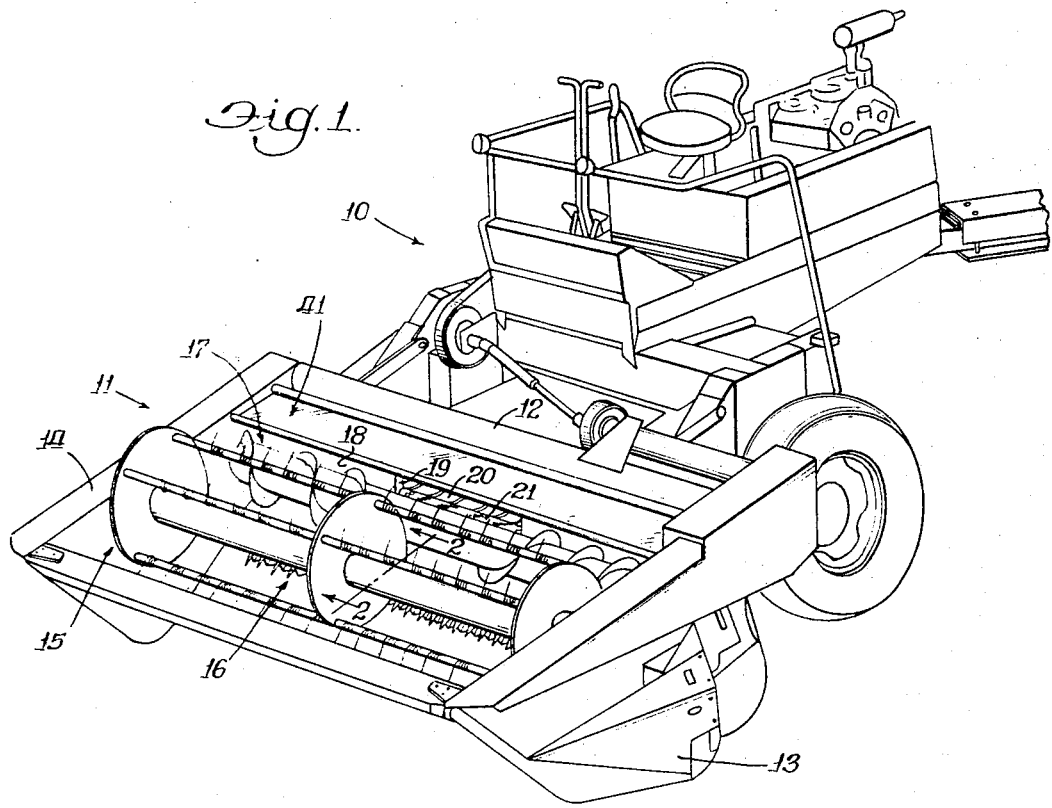
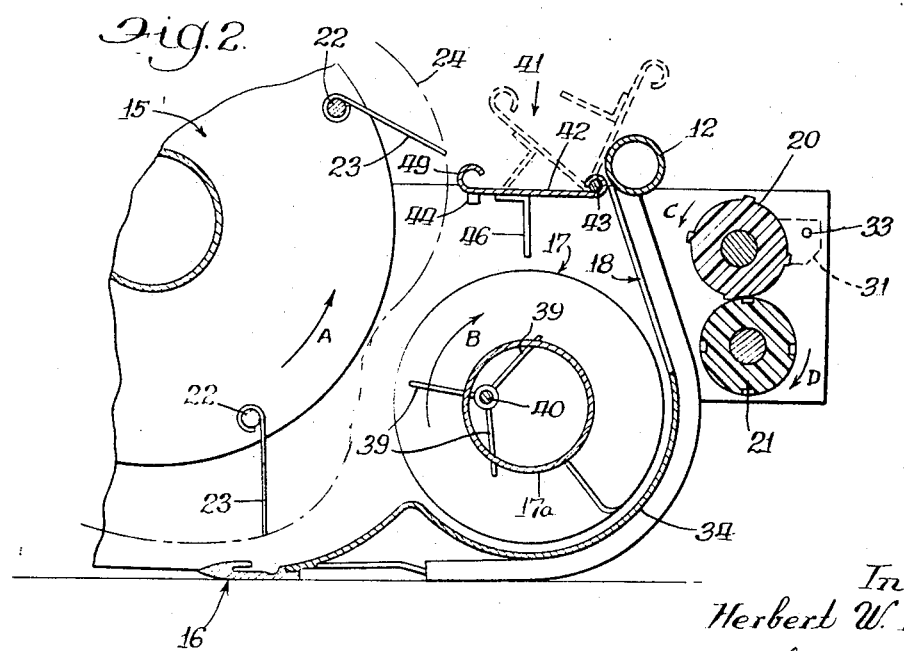
Inventor:
Herbert W. Molzahn
By Neal C. Johnson
Atty Oct. 28, 1969

H. W. MOLZAHN 3,474,602

HARVESTER PLATFORM WITH CROP STRIPPER AND GUIDING MEANS

Filed Oct. 23, 1967

Inventor:
Herbert W. Molzahn
By Neal C. Johnson
Atty.

3,474,602
HARVESTER PLATFORM WITH CROP STRIPPER AND GUIDING MEANS

Herbert W. Molzahn, Hamilton, Ontario, Canada, assignor to International Harvester Company, Chicago, Ill., a corporation of Delaware
Filed Oct. 23, 1967, Ser. No. 677,462
Int. Cl. A01d 41/02
U.S. Cl. 56—21                                    11 Claims

ABSTRACT OF THE DISCLOSURE

A harvester platform including a cutter and a reel for cutting a crop and moving the same rearwardly onto an auger mounted lengthwise of the platform. The auger delivers the crop to a discharge opening in the platform and includes a core for supporting the cut crop thereupon and flights for moving the cut crop toward the discharge opening for subsequent rearward movement of the crop through the opening. A crop stripper assembly is mounted on the platform in closely spaced relation above the auger and rearwardly of the reel and designed not only to strip the crop from the reel but also to maintain the crop upon the auger and to prevent the crop from wrapping behind the auger.

BACKGROUND OF THE INVENTION

Field of the invention

Thre invention relates generally to harvesters and more particularly to a harvester platform for windrowers designed to cut and convey a crop into a windrow.

Description of the prior art

Conventional windrowers commonly include a harvester platform having a reel mounted above a cutter mechanism and an auger-type conveyor mounted longitudinally of the platform for moving the cut crop toward a windrow-forming discharge area defined in the platform. Traditionally, the auger is designed to move the crop in a path between the platform and the lower portion of the auger. Since the crop is confined between the auger and the platform, it is subject to considerable beating and threshing action and the power requirements are high for rotating the auger. Moreover, the flow of the crop longitudinally of the platform and auger is subject to stoppage since the crop may wedge between the lower portion of the auger and the platform.

This type of conveyor is also susceptible to the problem of the crop wrapping around the auger so that the crop is not moved longitudinally thereof as desired.

Particularly in the case of long tangled crops, the reel of conventional harvester platforms may present a problem in that, portions of the cut crop may kickover or become entangled in the reel and wrap therearound instead of transferring smoothly onto the platform for subsequent movement toward the crop discharge area.

SUMMARY

The invention relates to an improved harvester platform for a windrower which includes a crop discharge area and a conveyor for supporting and moving the crop longitudinally of the platform toward the discharge area in such manner as to eliminate wedging of the crop between the platform and the conveyor. The platform is provided with means including a reel for moving the crop in a direction rearwardly of the platform toward the conveyor.

An important feature of the improved harvester platform resides in the provision of a crop stripper assembly above the conveyor and rearwardly of the reel. The stripper assembly is positionable into close proximity to the upper portion of the conveyor and the rearward peripheral portion of the reel for conjunctively stripping the crop from the conveyor and the reel. Consequently, the crop is prevented from wrapping around the reel and the conveyor, enabling the crop to be moved smoothly and uniformly throughout the harvesting operation.

Other features of the invention will become apparent in the subsequent description of the preferred embodiment.

BRIEF DESCRIPTION OF THE DRAWINGS

FIGURE 1 is a perspective view of a self-propelled windrower incorporating the harvester platform of the invention;

FIGURE 2 is a fragmentary sectional view of the harvester platform taken in the direction of arrows 2—2 of FIGURE 1;

DESCRIPTION OF THE PREFERRED EMBODIMENT

Figure 3:
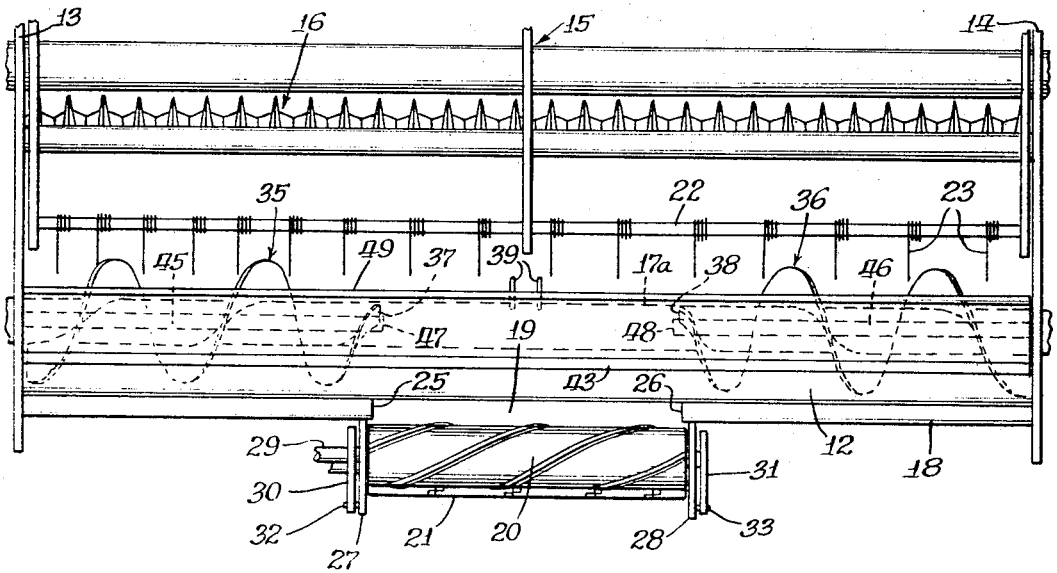
FIGURE 3 is a fragmentary plan view of the harvester platform of the invention; and, FIGURE 4 is a fragmentary perspective view of a portion of the harvester platform of the invention.
Figure 4:
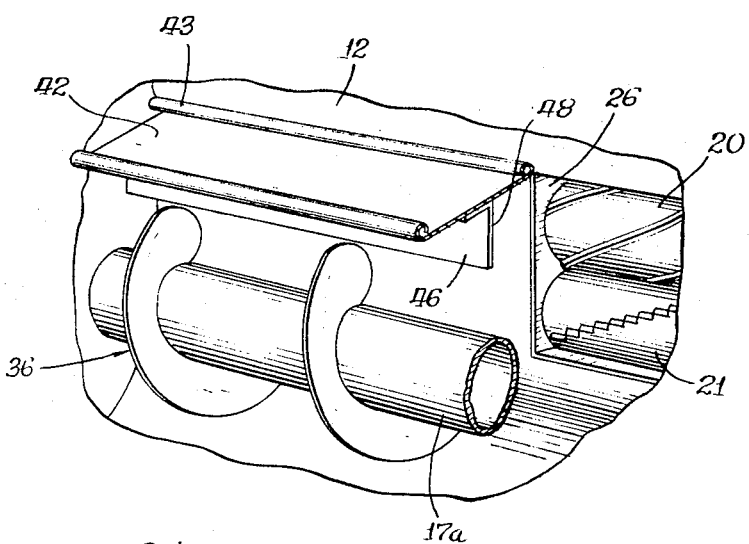

Referring first to FIGURE 1, there is shown a self-propelled windrower 10 which includes a harvester platform assembly 11 coupled to the forward end thereof through suitable connecting and lifting means. The platform 11 includes a rear frame member 12 extending lengthwise of the platform and a pair of upright sidewalls 13 and 14 extending forwardly from opposite ends of the frame member 12 as shown. Other major components of the platform assembly 11, shown generally in FIGURE 1, include a reel or delivery means 15 mounted between the sidewalls 13 and 14; a sickle-type cutter assembly 16 mounted along the bottom of the platform 11; and an auger 17 mounted along the platform 11 rearwardly of the reel 15 and cutter 16. The platform 11 further includes a rear wall 18 extending between the sidewalls 13 and 14 and through which a crop discharge opening 19 is defined rearwardly and above the auger 17. A pair of crop conditioning rollers 20 and 21 are mounted rearwardly of the crop discharge opening 19. The cooperative relationship of the above-mentioned components, in conjunction with other important features to be described, will become apparent as the description proceeds.

With reference now to FIGURES 2 and 3, the reel 15 may be of known kind and includes a plurality of circumferentially spaced longitudinally extending bars 22, each having a plurality of tines 23 thereon. The reel 15 may be of the cam-operated type functioning so that the tines 23 extend in predetermined directions so that the ends thereof define a path indicated by a dotted line 24 as the reel rotates. As best shown in FIGURE 2, the reel 15 is positioned above and somewhat forwardly of the cutter 16 so that the tines 23 move rearwardly over the cutter 16 and then upwardly and rearwardly in close proximity to the auger 17.

As shown generally in FIGURE 1, the crushing rollers 20 and 21 are disposed rearwardly of the discharge opening 19 which is longitudinally defined by generally vertically disposed edges 25 and 26. The rollers are preferably slightly longer than the longitudinal distance between the edges 25 and 26.

Referring again to FIGURES 2 and 3, the rollers 20 and 21 are rotatably mounted between a pair of mounting plates 27 and 28 extending rearwardly from the platform wall 18. The lowermost roller 21 is journaled in the plates 27 and 28. The uppermost roller 20 has a longitudinal shaft 29 extending through the plates 27 and 28 and journaled in arms 30 and 31. The arms 30 and 31 are pivotally coupled to the outside of the plates 27 and 28, respectively by pins 32 and 33, respectively. Suitable spring means (not shown) may be utilized to bias the roller 20 downwardly against the roller 21 to provide a crushing action therebetween. The rollers 20 and 21 are adapted to be rotatably driven through suitable means interconnected with the power source of the windrower.

The auger 17 is rotatably mounted between the sidewalls 13 and 14 rearwardly of the cutter 16 above a semicylindrical trough portion 34 of the rear wall 18. As best shown in FIGURE 3, the auger 17 includes a cylindrical core 17a and a pair of helical conveying flights 35 and 36 on the core extending inwardly from opposite ends respectively of the auger and terminating in thinner ends 37 and 38, respectively. The flight ends 37 and 38 are positioned proximate to the edges 25 and 26, respectively, so as to define a void in longitudinal register with the crop discharge opening 19.

As best shown in FIGURE 2, the auger 17 is provided with a plurality of radiating pickup or discharge fingers 39 mounted on a shaft 40 disposed eccentrically with respect to the axis of rotation of the auger. The fingers 39 project outwardly through openings in the core 17a of the auger and are arranged to extend outwardly and retract inwardly in known manner upon rotation of the auger. As best shown in FIGURE 3 the pickup fingers 39 are disposed on the auger in the void defined between the flight ends 37 and 39 so as to feed the cut crop over the auger and rearwardly through the crop discharge opening 19.

In accordance with an important feature of the invention, the harvester platform 11 includes a crop stripper and guide assembly shown generally at 41 in FIGURE 1. The assembly 41 includes an elongated plate 42 pivotally connected at 43 to the rear wall 18 along the upper edge thereof approximate to the rear frame member 12. The plate 42 extends lengthwise of the platform so as to be coextensive in length with the auger and the reel. The plate 42 is adapted to be supported in a generally horizontal position by means of tabs projecting inwardly from the sidewalls 13 and 14 beneath the plate. One such tab is shown generally at 44 in FIGURE 2.

The crop stripper assembly 41 includes means for stripping the crop from the conveying flights of the auger to prevent the crop from wrapping therearound, in conjunction with guiding the crop longitudinally of the auger and platform toward the discharge opening 19. Toward that result, a pair of stripper bars 45 and 46 are secured to the underside of the plate 42 and extend inwardly from opposite ends thereof in close proximity to the upper portion of the flights 35 and 36, respectively. As shown in FIGURE 3, the stripper bars 45 and 46 terminate in inner ends 47 and 48 spaced apart to define a void or gap in longitudinal register with the crop discharge opening 19. It will also be seen that each of the stripper bars 45 and 46 has a length substantially equal to the longitudinal extent of the respective flights 35 and 36.

The crop stripper assembly 41 also provides means for stripping the crop from the periphery of the reel 15 to prevent the crop from wrapping on the reel. Toward that result, it will be seen in FIGURE 2 that the plate 42 terminates in a front edge 49 disposed in close proximity to the rearward portion of the periphery of the reel. The ends of the tines 23 are movable upwardly in the path 24 in close proximity to the edge 49. Consequently, any portion of the crop adhering to the tines will be stripped therefrom and will fall onto the auger for movement toward the crop discharge opening.

OPERATION

As the windrower is moved forwardly, the reel 15 is rotatably driven in the direction of arrow A so that the tines 23 move rearwardly over the cutter 16 which cuts the standing crop. The cut crop is engaged by the tines and is moved rearwardly toward the auger 17 which is rotatably driven in the direction of arrow B so that the adjacent peripheral portions of the reel and auger move in similar directions. The crop is thus lifted between the tines and the auger for deposit on the upper portion of the auger.

The portions of the crop deposited on the flights 35 and 36 will be conveyed by the flights longitudinally of the platform and auger inwardly toward the pickup fingers 39. Concurrently, the portion of the crop deposited on the auger forwardly of the crop discharge opening will be lifted upwardly and rearwardly over the auger by the pickup fingers 39 in conjunction with the pickup fingers performing the same function with respect to the crop conveyed inwardly thereto by the flights.

With the crop stripper assembly 41 disposed in the horizontal position illustrated in FIGURES 1 through 4, the stripper bars 45 and 46 are disposed in close proximity to the upper crop-carrying portions of the flights 35 and 36, respectively. Accordingly, the stripper bars serve to prevent the crop from wrapping around the flights, in conjunction with guiding the crop longitudinally of the auger toward the middle or center portion forwardly of the crop discharge opening 19. The pickup fingers operate to move the crop rearwardly through the gap or void between the ends 37 and 38 of the flights and between the ends 45 and 48 of the stripper bars and under the plate 42. The rollers 20 and 21 are rotatably driven in the direction of arrows C and D respectively for receiving and crushing the crop therebetween as the crop is fed rearwardly through the crop discharge opening.

As above mentioned any crop adhering to or entangled in the tines will be stripped therefrom as the tines move upwardly past the edge 49 of the plate 42.

The pivotal connection of the stripper assembly 41 enables the same to pivot upwardly as shown in dotted lines in FIGURE 2 is response to unusually heavy crop loading on the auger. Accordingly, wedging or jamming of the crop is substantially reduced. In addition the crop stripper assembly 41 may be manually pivoted upwardly to form an upward extension of the backwall 18 to prevent an unusually heavy crop from moving rearwardly over the backwall.

From the foregoing it will be appreciated that the harvester platform structure of the invention permits the crop to flow smoothly through the device by eliminating the problems of wedging, undue threshing, and wrapping often encountered in prior machines. Moreover, the platform structure is adapted to accommodate unusually heavy bunches of crop without plugging or jamming.

Various changes falling within the scope and spirit of the invention may occur to those skilled in the art. The invention is therefore not to be thought of as limited to the specific embodiment set forth.

I claim:
1. A crop harvester including an elongated platform having a crop discharge area, a conveyor for moving the crop longitudinally of said platform toward said discharge area, delivery means for moving the crop rearwardly toward said conveyor, and a crop stripper member mounted on said platform above said conveyor and rearwardly of said delivery means in position to sustain the crops on the conveyor, said crop stripper member further extending lengthwise of said delivery means in close proximity thereto, said delivery means being rotated in such direction that its rearward peripheral portion moves generally upwardly past said stripper member, whereby any crop adhering to the rearward peripheral portion of said delivery means will be stripped therefrom by said crop stripper member.

2. The subject matter of claim 1, including a stripper bar secured to the underside of said crop stripper member and extending longitudinally of said conveyor in close proximity to the upper portion thereof for stripping the crop therefrom to prevent the crop from wrapping around said conveyor in conjunction with guiding the crop toward said crop discharge area.

3. A crop harvester having a laterally elongated platform with a crop discharge opening defined therethrough, comprising:
  an auger extending lengthwise of said platform for moving the crop lengthwise over said platform, said auger being rotated in such direction that its upper portion supports the crop thereon for movement toward said crop discharge opening; and,
  crop stripper means mounted on said platform above said auger and extending the length of said auger for stripping the crop therefrom in conjunction with guiding the crop lengthwise thereof, whereby the crop is prevented from wrapping around said auger as the crop moves toward said discharge opening.

4. The subject matter of claim 3, in which said crop stripper means includes an elongated plate having a stripper bar secured on the underside thereof, said stripper bar extending parallel to said auger in close proximity to the upper portion thereof and terminating in an end positioned proximate to an edge of said crop discharge opening, enabling the crop to be conveyed substantially along the longitudinal extent of said stripper bar until the crop passes said end thereof whereupon the crop is moved through said discharge opening.

5. The subject matter of claim 3, including a cutter mounted along said platform forwardly of said auger; a reel rotatably mounted lengthwise of said platform generally above said cutter and forwardly of said auger and said crop stripper means, said reel including peripheral elements moving close to said cutter and engaging the crop being cut and thereafter moving in a path closely adjacent to the periphery of said auger and the forward edge of said crop stripper means whereby any portion of the crop adhering to said peripheral elements will be stripped therefrom by said crop stripper means.

6. The subject matter of claim 3, in which said crop stripper means is pivotally connected to said platform so as to extend over said auger in close proximity thereto when disposed in a substantially horizontal position, said crop stripper means being free to pivot upwardly and away from said horizontal position in resopnse to heavy crop loading on said auger, thereby enabling the crop to be moved toward said crop discharge opening without wedging and jamming between said auger and crop stripper means.

7. The subject matter of claim 6, in which said platform includes a trough portion extending beneath said auger and further includes a backwall portion extending generally upwardly from said trough portion, said crop stripper means being pivotally connected proximate to the top of said backwall portion whereby said crop stripper mean forms an upward extension of said backwall portion when pivoted upwardly from said horizontal position to prevent the crop from moving rearwardly over said backwall portion.

8. A crop harvester having a laterally elongated platform with a crop discharge opening defined therethrough intermediate the ends thereof, comprising:
  an auger mounted lengthwise of said platform and spanning said discharge opening, said auger having crop-conveying flights extending from each end inwardly toward said crop discharge opening and being rotated in such direction that the crop is supported on the upper portion of said auger for movement by said flights toward said discharge opening; and
  crop stripper means mounted on said platform overlying said auger and extending the length thereof for preventing the crop from wrapping therearound in conjunction with guiding the crop toward said discharge opening, said crop stripper means including stripper bars overlying said flights in close proximity thereto and terminating in inner ends spaced apart from each other to define a void in longitudinal register with said crop discharge opening, thereby enabling the crop to be moved by said auger rearwardly through said void toward said discharge opening.

9. The subject matter of claim 8, including a pair of cooperative crushing rollers mounted on said platform rearwardly of said crop discharge opening for crushing the crop prior to deposition on the ground in a windrow.

10. The subject matter of claim 8, including a cutter mounted along said platform forwardly of said auger;
  a reel rotatably mounted lengthwise of said platform generally above said cutter and forwardly of said auger and said crop stripper means, said reel including peripheral elements moving close to said cutter and engaging the crop being cut and thereafter moving in a path closely adjacent to the periphery of said auger and the forward edge of said crop stripper means, whereby any portion of the crop adhering to said peripheral elements will be stripped therefrom by said crop stripper means to thereby prevent the crop from wrapping on said reel.

11. The subject matter of claim 8, in which said crop stripper means is pivotally connected to said platform so as to extend over said auger in close proximity thereto when disposed in a substantially horizontal position, said crop stripper means being free to pivot upwardly and away from said horizontal position in response to heavy crop loading on said auger, thereby enabling the crop to be moved toward said crop discharge opening without wedging and jamming between said auger and crop stripper means.

References Cited

UNITED STATES PATENTS

| | | | |
|---|---|---|---|
| 2,836,027 | 5/1958 | Pearson | 56—23 |
| 3,213,601 | 10/1965 | Rowland-Hill | 56—20 |
| 3,270,489 | 9/1966 | Rohweder | 56—21 |

LOUIS G. MANCENE, Primary Examiner

J. W. MITCHELL, Assistant Examiner

U.S. Cl. X.R.

56—23